Feb. 20, 1951  J. W. FAULHABER ET AL  2,542,317
VEHICLE HEATER

Filed Aug. 20, 1949  4 Sheets-Sheet 1

INVENTOR.
JAMES W. FAULHABER
FERD W. FISHER
HOMER CHARLES SIMONS
by McDonald & Teagno
ATTORNEYS

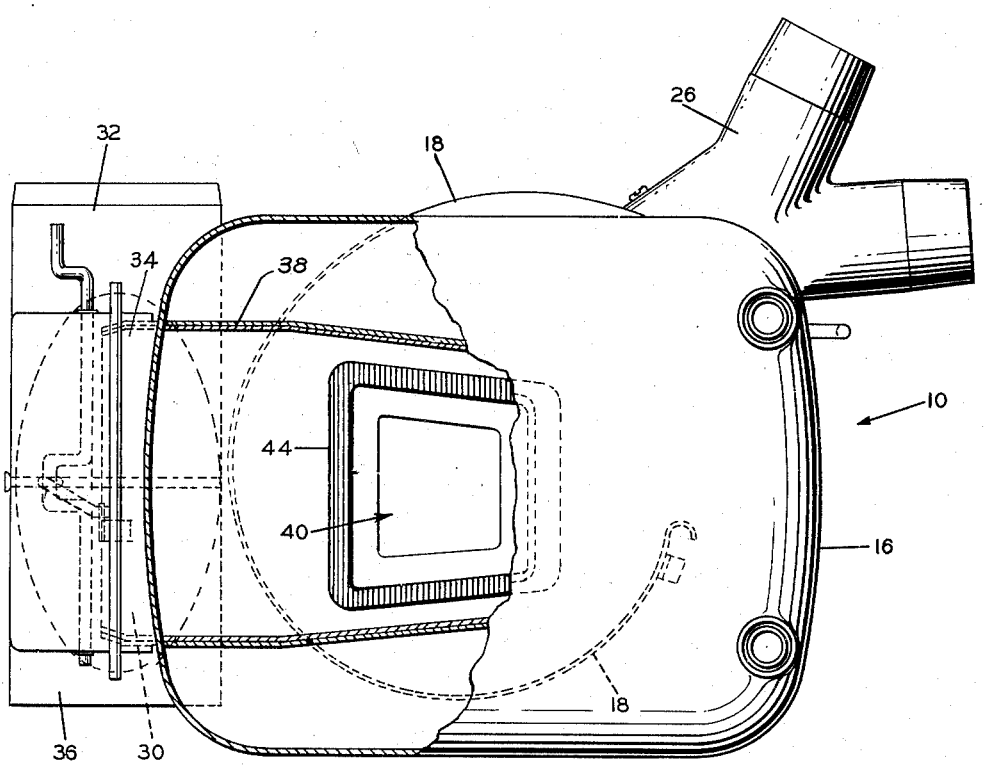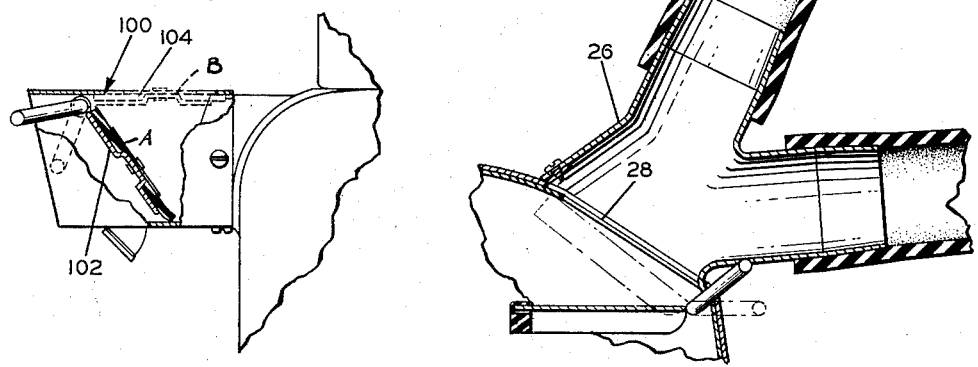

Feb. 20, 1951    J. W. FAULHABER ET AL    2,542,317
VEHICLE HEATER
Filed Aug. 20, 1949    4 Sheets-Sheet 3
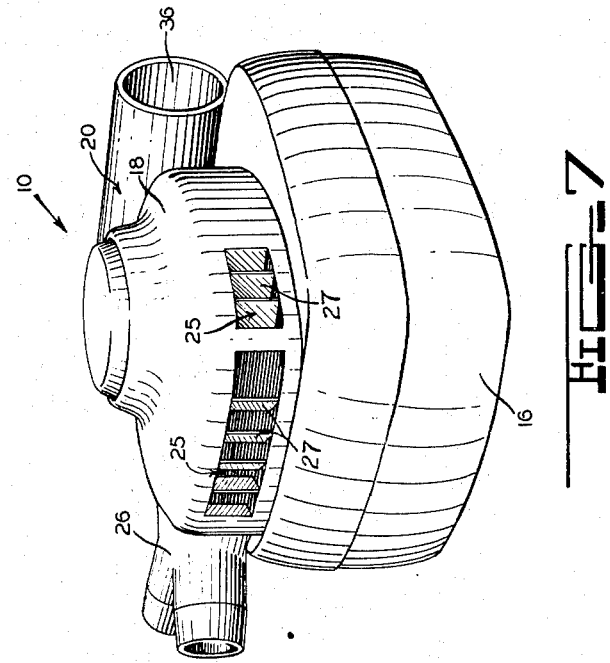
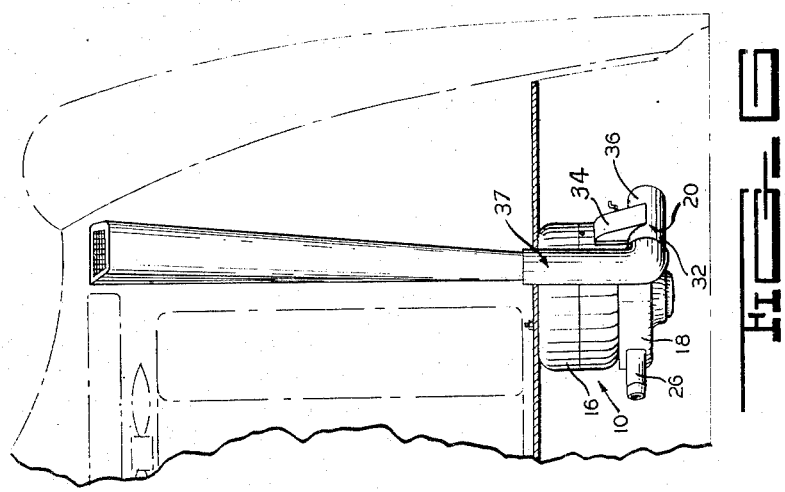
INVENTOR.
JAMES W. FAULHABER
FERD W. FISHER
BY HOMER CHARLES SIMONS
ATTORNEYS Feb. 20, 1951 J. W. FAULHABER ET AL 2,542,317
VEHICLE HEATER
Filed Aug. 20, 1949 4 Sheets-Sheet 4
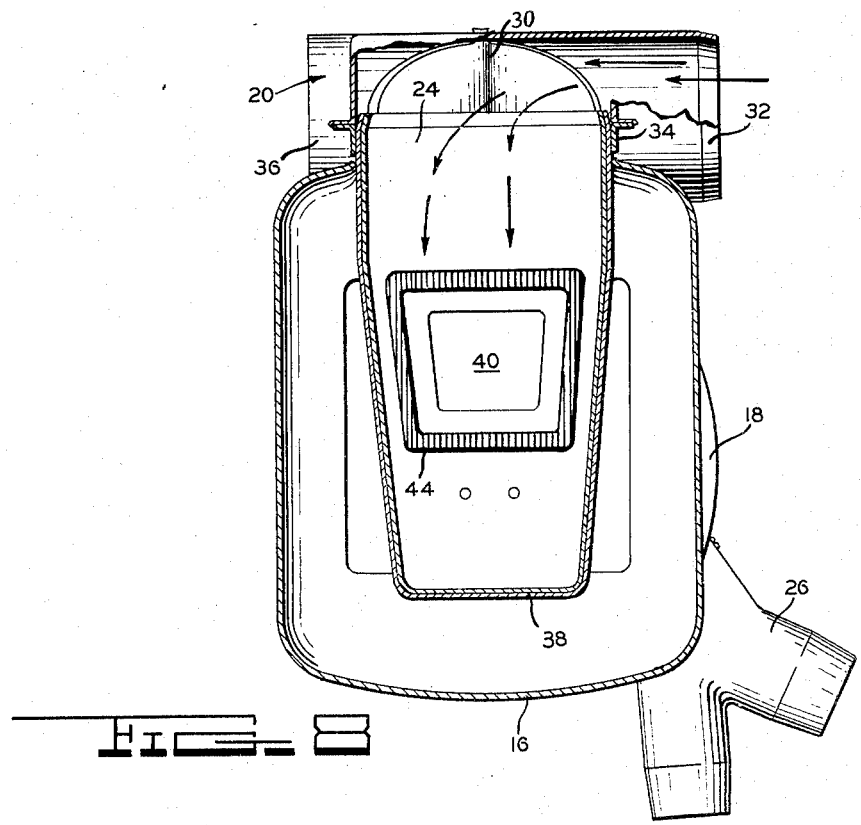
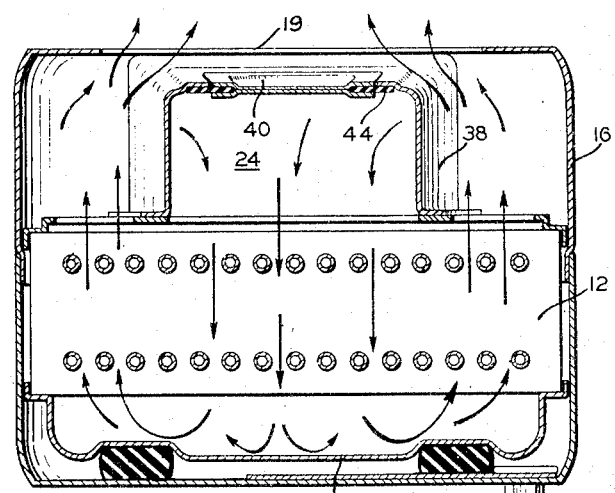
INVENTOR.
JAMES W. FAULHABER
FERD W. FISHER
BY HOMER CHARLES SIMONS
*McDonald & Trago*
ATTORNEYS Patented Feb. 20, 1951

2,542,317

UNITED STATES PATENT OFFICE 2,542,317

VEHICLE HEATER

James W. Faulhaber, Cleveland, and Ferd W. Fisher and Homer Charles Simons, Maple Heights, Ohio, assignors to Eaton Manufacturing Company, Cleveland, Ohio, a corporation of Ohio Application August 20, 1949, Serial No. 111,436

7 Claims. (Cl. 98—2)

This invention relates to heating and ventilating and more particularly to a combination fresh air heating and ventilating system for automotive vehicl. s and the like.

Broadly, the invention comprehends the provision of a fresh air heating and ventilating system for vehicles having appropriate valving incorporated therein providing for the delivery of air to the vehicle passenger compartment and/or windshield at varying pressures and variable heat.

Although numerous combinations of heating and ventilating systems have been devised for automotive vehicles and the like, none have incorporated valves in the fresh air supply ducting and in the air passage ducting associated with the heat exchange element per se of the system in a compact and efficient manner to permit upon predetermined manipulative control of the valves several different conditions of air flow both as to capacity and temperature.

An object of the invention is the provision of a heating and ventilating system for vehicles having control valves in the air flow passages thereof for effectively regulating the temperature and capacity of air delivered to the passenger compartment of the vehicles.

Another object of the invention is the provision of a heating and ventilating system for vehicles having a pair of valves incorporated in the flow path of the air from the source of fresh air external of the vehicle to the passenger compartment of the vehicle, one valve controlling the air delivery to the air as it initially enters and passes into the system and the other valve modulating the flow to the heat exchange el.ment of the system or for by-passing the air therearound for temperature regulation of the air to be delivered to the passenger compartment.

A further object of the invention is the provision of a heating and ventilating system for automotive vehicles utilizing a pair of air flow control valves, one effective upon selective position thereof to provide for fresh air delivery directly to the passenger compartment of the vehicle, recirculation of air blower impelled air from the passenger compartment back through the heat exchange element to the compartment and fresh air delivery to the passenger compartment by way of the heat exchange element and the other valve effective to regulate the amount of air to be delivered directly to the heat exchange element or by-pass directly to the passenger compartment, thus effective to vary the air flow control directly past the first valve.

A yet further object of the invention is the provision of an automotive heating and ventilating system incorporating basically, a heat exchange element, an air propelling mechanism, appropriate ducting for conveying air from either externally or internally of the passenger compartment of the vehicle to the heat exchange element and propelling mechanism, and air flow control valves associated with the ducting, heat exchange element and air propelling mechanism for the desired fresh or recirculated flow of air and the desired temp ring thereof for delivery to the passenger compartment.

Other objects and advantages of the invention will appear from the following description taken in connection with the drawings, forming a part of the specification, and in which:

Fig. 2 is a front plan partially cross-sectionalized view of the heater and ventilator apparatus of Fig. 1;

Fig. 4 is a fragmentary cross-sectionalized view of the defroster outlet and the air flow control valve therefor;

Fig. 5 is a fragmentary front plan view of a modified form of air inlet duct and its associated air flow control valve;

Fig. 6 is a top elevation view of the apparatus of Fig. 1 as applied to a vehicle;

Fig. 7 is a perspective view of the apparatus of Fig. 1 clearly showing the outlet openings in the casing thereof;

Fig. 8 is a cross-sectionalized view taken substantially along lines 8—8, Fig. 1 and Fig. 9 is a cross-sectionalized view taken substantially along lines 9—9, Fig. 1.

Figure 1:
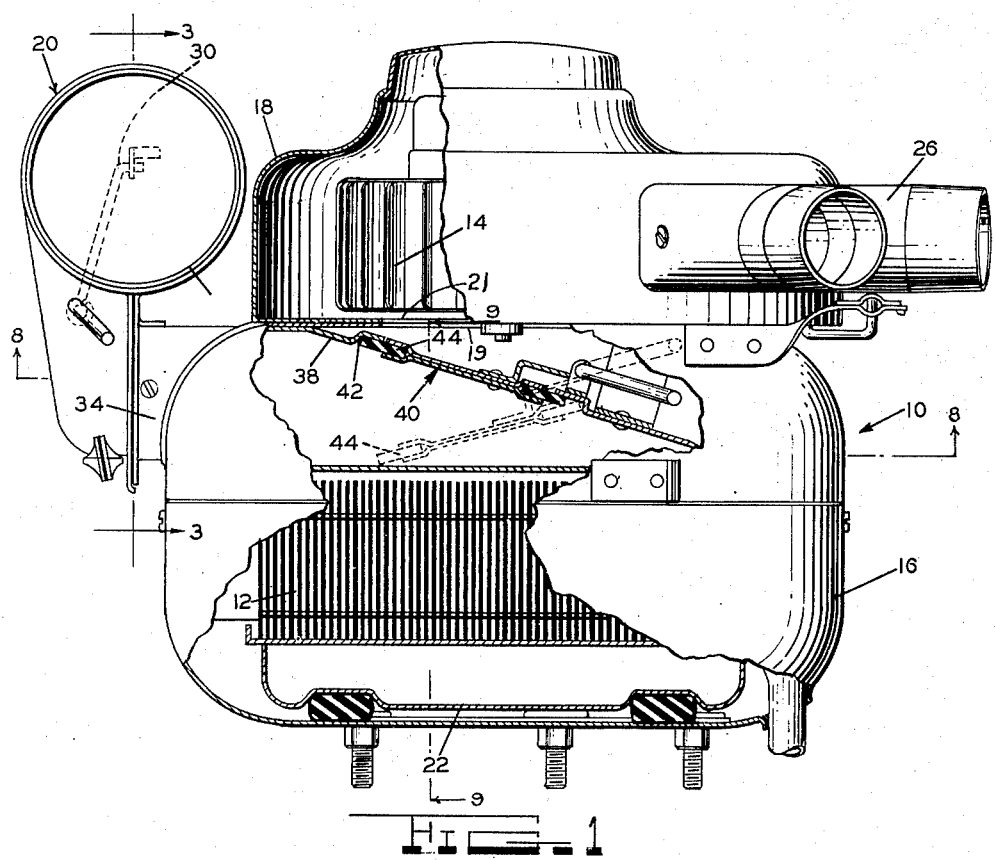
Fig. 1 is a top plan partially cross-sectionalized view of a heater and ventilator apparatus per se and its incorporat:d air control means.

The present heater and ventilator apparatus was devised for the purpose of providing an economical structure effective to deliver fresh or recirculated air heated or unheated and regulated as to temperature delivery adaptable to automotive vehicles and the like. The regulated temperature of the air delivered by the apparatus is achieved by the admixing of fresh unheated and fresh heated air preparatory to its discharge into the compartment in which it is to be received. The admixing of the air is achieved by the provision of a valve or gate member located in the air flow channel extending into the heat exchange element such that air can be brought into the vehicle through the heat exchange element or around the heat exchange element in varying degrees as desired.

A valve or gate member similar to that disclosed in copending application Serial No. 2,753 filed in the name of Franklin Edwards on January 16, 1948, is utilized in the inlet fresh air duct to permit of the direct fresh air delivery to the passenger compartment, the fresh air delivery to the heat exchange element and/or the delivery of recirculated air to the heat exchange element.

The admixing valve means together with the valve for fresh air or recirculated air control permit of several conditions or air pressure flow and temperature regulation as may be required for properly heating the passenger compartment and/or defrosting the windshield of the vehicle.

Referring to the drawings for more specific details of the invention 10 represents generally a combination heating and ventilating apparatus adaptable to automotive vehicles and the like comprising basically a heat exchange unit 12, an air propelling device 14, a casing 16 housing the heat exchange unit therein and a shroud 18 for the air propelling device mounted in air communicating relation with casing 16 thereon by way of outlet opening 19 in the casing and inlet opening 21 in the shroud; and air conveying ducting 20 mounted on the casing 16 in air communicating relation thereto.

The heat exchange unit 12 is of the two path air flow type more fully defined in co-pending application Serial No. 777,507 of V. Matulaitis filed October 2, 1947, and wherein the unit is mounted in the casing 16 having a cover or baffle plate 22 completely enclosing one face of the unit and an air flow channel member 24 on its opposite face covering approximately half the face area thereof such that air is permitted to pass through the channel through a portion of the unit and after passing through said portion is directed by the plate 22 back through the other portion of the unit substantially surrounding the first air pass portion. After passing through the second air pass portion of the heat exchange unit the air exiting therefrom passes out around the exterior surface of the channel member 24 and is discharged from casing 16 through openings 19 and 21 into the central air receiving zone of air propelling device 14, which in this case is preferably a radial flow air blower. The air received by the blower is in turn impelled thereby out of the shroud therefor for delivery either to the passenger compartment of the vehicle to which the apparatus is adapted through an outlet opening 25 provided in the side and bottom of shroud 18 having a plurality of baffles 27 therein or through air flow defroster ducting 26 controlled as by air flow control valve 28 therefor.

Figure 3:
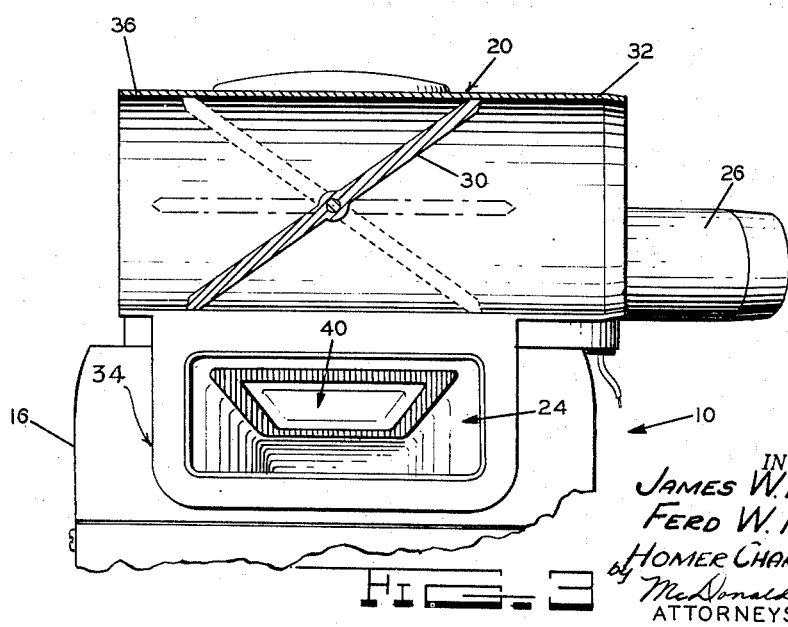
Fig. 3 is a fragmentary cross-sectionalized view taken along substantialy lines 3—3, Fig. 1.

The air conveying ducting 20 as shown by Fig. 3 is in the shape of a T having a three way control butterfly valve 30 therein for the desired flow of air therethrough. The ducting 20 comprises branches 32, 34 and 36 for air flow communication respectively with a fresh air conduit or the like 37 extending from a point externally of a vehicle to which the apparatus is adapted, the air inlet or channel member 24 of the heater per se and directly with the passenger compartment of the vehicle. The valve 30 as shown by Fig. 3 is pivotal about an axis substantially intercepting the axis of branch ducts 32 and 36 and is movable to any one of several positions but specifically controls three major conditions of air flow, that is, fresh air delivery from the exterior of the vehicle directly to the interior thereof, fresh air delivery from the exterior of the vehicle to the heat exchange unit and the air propelling device for the heating and delivery to the interior of the vehicle, and the recirculation of heated air through the heat exchange unit and air propelling device by way of branch 36 communicating with the interior of the vehicle. Valve 30 together with ducting 20 and the heat exchange unit 12 and air propelling device 14 provide for the desired heating or ventilating of the vehicle interior as conditions require. This feature of air flow control and delivery is more fully defined in co-pending application of Franklin Edwards, Serial No. 2,753 filed January 16, 1948.

The channel member 24 has pivotally arranged in an angular wall 38 thereof a gate or valve 40 movable therein to control an opening 42 provided in wall 38 permitting of the by-pass flow of air as delivered by ducting 20 through branch 34 to air inlet channel member 24 of the heater per se therethrough directly to the air propelling device 14 without the heating thereof. The gate or valve 40 can be moved to any position intermediate full closed position in the wall 38 of channel member 24 and full open position with the end 44 thereof abutting the face of the heat exchange unit with which the channel member 24 is associated. The valve 40 in its full open position provides for substantially all of the air delivered to the inlet of the channel member at its junction with the branch 34 of the T ducting 20 to pass directly to the air propelling device for subsequent delivery therefrom to the interior of the vehicle. The valve 40 in being adaptable to positioning as desired is effective to modulate the temperature of the air to be propelled by the blower, inasmuch as the air by-passing around the heat exchange unit becomes admixed with the heated air passed through the heat exchange unit. By this means of tempering the air the conventionally used thermostatically regulatable valve for controlling the flow of heated liquid can be dispensed with, thus affording a material cost saving.

The valve 40 is usable conjunctively with valve 30 for the purpose of providing the most desirable condition of air flow at the proper temperature. As examples of the cooperative effect of the valves, the valve 30 can be placed in position for full fresh air flow and the valve 40 can be placed in full open position, thus permitting of the blower propelled delivery of fresh unheated air to the interior of the vehicle or the valve 30 can be placed in recirculated air shunting position with valve 40 in full open position and thereby affect a mere circulation of unheated air within the vehicle. Many other air flow and temperature regulated conditions can be obtained by the proper manipulation of the valves 30 and 40.

The valves 28, 30 and 40 are all to be manually operated by appropriate controls, not shown, adapted to be located on or adjacent the vehicle dash connected to the valves by suitable control cables or the like, not shown.

Fig. 5 illustrates a modified form of air conveying ducting 100 to be used where suitable in place of ducting 20 of the preferred structure extending from connection with suitable conduit of first air inlet relation to air inlet connection with casing 16 having an intermediate opening 104 communicating with the interior of a vehicle body, not shown, providing for recirculation admission of air therethrough for passage to the heater casing 16 controlled as by a two way valve 102 effective in one limit position shown by full lines A to inhibit flow of fresh air into the casing by way of ducting 100 while permitting recirculation flow of air to casing 16 and when in its other limit position shown by dotted lines B, inhibiting recirculation air flow while permitting fresh air flow into the casing through ducting 100.

While this invention has been described in connection with certain specific embodiments, the principle involved is susceptible of numerous other applications that will readily occur to persons skilled in the art. The invention, therefore, is limited only as indicated by the scope of the appended claims.

What we claim is:

1. In a heating and ventilating device for vehicles, an air conducting conduit extending from a point exteriorly of the body of the vehicle to a point interiorly of the vehicle having a branch connection substantially intermediate the exterior and interior connections thereof, a combination heat exchanger and air impeller apparatus having air inlet connection with the branch connection of the conduit and having air discharge means into the interior of the body of the vehicle, a partition in the combination apparatus between the inlet connection and discharge means thereof, a three-way valve pivotal in the junction of the conduit at the branch connection with its pivot axis intercepting the axis of the conduit and a two-way valve pivotal at one end thereof in the partition in combination apparatus intermediate the heat exchanger and air impeller with its pivot axis disposed away from the air inlet connection of the combination apparatus and its free end disposed in close relation thereto, said three-way valve operable in one limit position to direct all air entering the exterior connection of the conduit to pass into the combination apparatus, in another limit position to permit of a recirculation of air from the interior of the vehicle to enter the interior connection of the conduit and pass into the combination apparatus and in a third position to provide for the passage of air directly from the exterior connection to the interior of the vehicle through the interior connection and said two-way valve in one limit position to direct all air entering the combination apparatus to pass through the heat exchanger prior to passage through the air impeller, in another limit position to direct substantially all air entering the combination apparatus to pass directly through the air impeller without ever passing through the heat exchanger and positionable between the limit positions to divide the flow of air to the respective heat exchanger and air impeller.

2. In a heating and ventilating device for vehicles, a major air conducting conduit extending from the exterior to the interior of the vehicle body, a branch air conducting conduit extending from communication with the major conduit substantially intermediate the length thereof forming a T junction therewith, a combination heat exchanging and air impelling apparatus having air inlet connection with the branch conduit and air discharge into the interior of the vehicle body comprising a casing, a heat exchanger therein, an air impeller therein, an angularly disposed partition in the casing extending from a point disposed away from the heat exchanger at the air inlet to the combination apparatus to the one face of the heat exchanger remotely disposed from the air inlet connection to the combination apparatus between the inlet connection and air discharge of the combination apparatus for directing all the air directly through the heat exchanger and a valve in the partition movable to substantially shunt all the air around the heat exchanger when in one position and to modulate the air flow directly to the heat exchanger and air impeller between full open and closed positions and a three-way valve pivotal in the major conduit at the T junction for variable control of air flow through the branches of the conduit.

3. In a heating and ventilating device for vehicles, a major air conducting conduit extending from the exterior to the interior of the vehicle body, a branch air conducting conduit extending from communication with the major conduit substantially intermediate the length thereof forming a T junction therewith, a heat exchange device comprising a casing having air inlet connection with the branch conduit and an air discharge opening, a heat exchanger mounted in the casing, an air directing partition extending from the air inlet connection disposed away from a face of the heat exchanger to the face of the heat exchanger remotely disposed from the air inlet connection separating the inlet connection from the air discharge opening of the casing, and a valve normally disposed in the plane of the partition controlling communication directly between the inlet connection and discharge opening, an air impeller device comprising a shroud having air inlet connection with the discharge opening from the heat exchange device casing and an air discharge opening into the interior of the vehicle body, and an air impeller mounted for rotation in the shroud, and a three-way valve pivotally mounted in the major conduit at the T junction thereof controlling the flow of air for directional delivery as desired.

4. In a heating and ventilating device for vehicles, a major air conducting conduit extending from the exterior to the interior of the vehicle body, a branch air conducting conduit extending from communication with the major conduit substantially intermediate the length thereof forming a T junction therewith, a heat exchange device comprising a casing having air inlet connection with the branch conduit and an air discharge opening, a heat exchanger mounted in the casing, a channel member extending in air communicating relation from the inlet connection of the casing to a face of the heat exchanger covering a portion thereof having an angular roof which is disposed away from the surface of the heat exchanger at one end and in contact with the surface of the heat exchanger at its other end, a pan fully enclosing the opposite face of the heat exchanger and a valve in the roof of the channel member controlling communication directly between the inlet connection and discharge opening of the casing pivotal about an axis near the heat exchanger surface contact end of the roof with its free end swingable from the roof to the surface of the heat exchanger near the air inlet connection of the heat exchange device, an air impeller device comprising a casing having air inlet connection with the discharge opening of the heat exchanger casing and an air discharge opening into the interior of the vehicle body and an air impeller mounted for rotation in the second mentioned casing, and a three-way valve pivoted in the major conduit at the T junction thereof controlling the flow of air as desired through the respective branches thereof.

5. A heater apparatus comprising a casing having an air inlet connection and an air discharge opening, a heat exchanger mounted in the casing, a partition extending angularly from the air inlet connection to one face of the heat exchanger separating the air inlet connection of the casing from the air discharge opening thereof, a valve normally in the plane of the partition hinged thereon near the contact relation of the one end of the partition to the face of the heat exchanger with its free end movable through a path between the partition and surface of the heat exchanger near the air inlet connection to the casing controlling air flow therethrough, a shroud mounted juxtaposed the casing having an air inlet communicating with the discharge opening therein and an air discharge opening, and an air impeller mounted for rotation in the shroud.

6. A heater apparatus comprising a casing having air inlet and discharge openings therein, a heat exchanger mounted in the casing, a duct extending between the air inlet opening to a portion of one face of the heat exchanger for conveying air therebetween and separating the air inlet and discharge openings from direct communication with one another, a valve normally angularly positioned in the duct in facing relation to the air inlet opening in the casing and hinged remotely disposed from the inlet opening with its free end movable across the passage of the air inlet opening in close proximity thereto for controlling the flow of air directly between the air inlet and discharge openings, a shallow pan member completely enclosing the other face of the heat exchanger oppositely disposed to the duct, a blower shroud mounted on the casing having air inlet and discharge openings therein, the inlet opening of which is in direct communication with the discharge opening in the casing and a blower wheel mounted for rotation in the shroud.

7. In a heating and ventilating device for vehicles, a casing having air inlet and discharge openings therein, an air conducting conduit extending from the exterior of the vehicle to air flow connection with the inlet opening of the casing having air opening communication interior of the vehicle intermediate the portion thereof exterior of the vehicle and its communication with the casing, a valve in the conduit for controlling the exterior and intermediate communications of the conduit, a heat exchanger in the casing, a partition in the casing separating the inlet and discharge openings therein from one another, valve means pivotal in the partition in the casing in the form of a door hinged at one end remotely disposed from the air inlet opening of the casing with its free end disposed in closer proximity to the inlet opening than the hinged end thereof movable across the inlet opening air passage area of the casing normally controlling communication between the inlet and discharge openings in the casing, a shroud mounted on the casing having air inlet and discharge openings therein, said inlet opening communicating directly with the discharge opening in the casing and an air impeller mounted for rotation in the shroud.

JAMES W. FAULHABER.
FERD W. FISHER.
HOMER CHARLES SIMONS.

REFERENCES CITED

The following references are of record in the file of this patent:

UNITED STATES PATENTS

| Number | Name | Date |
|---|---|---|
| 1,871,225 | Shurtleff | Aug. 9, 1932 |
| 2,026,929 | Backe | Jan. 7, 1936 |
| 2,198,337 | Graef | Apr. 23, 1940 |
| 2,253,671 | Whitney | Aug. 26, 1941 |
| 2,295,750 | Norris et al. | Sept. 15, 1942 |
| 2,325,427 | Reynolds | July 27, 1943 |

FOREIGN PATENTS

| Number | Country | Date |
|---|---|---|
| 846,879 | France | June 19, 1939 |